UNITED STATES PATENT OFFICE.

GEORG SCHNABEL, OF NIEDERODERWITZ, SAXONY.

PRESERVATION OF MEAT.

1,406,513.

Specification of Letters Patent. Patented Feb. 14, 1922.

No Drawing. Application filed April 2, 1921. Serial No. 458,058.

*To all whom it may concern:*

Be it known that I, GEORG SCHNABEL, manufacturer, citizen of Saxony, residing at Niederoderwitz, Saxony, have invented certain new and useful Improvements in the Preservation of Meat, (for which I have filed an application in Germany on May 3, 1915,) of which the following is a specification.

My invention relates to the preservation of meat and more especially to a method for rendering fresh raw meat stable to such an extent that the character of fresh meat is preserved, and the meat treated according to my invention may be used even after the lapse of several months in exactly the same manner as fresh meat. My invention further refers to the novel product obtained thereby.

With these objects and purposes in view my invention substantially consists therein that fresh meat first of all is treated with dry salt and preferably with a mixture of dry salt and powdered condiments, such salt or salt mixture being applied thereon by spraying, preferably by aid of a blower, in order to cause it to enter in all fissures and subexcavations of the meat. I thereafter subject the meat thus treated to the action of a current of dry air so as to dry it to some extent, the temperature being kept below the temperature at which albumin coagulates. It is essential that the loss in weight caused by the drying process exceed not 30 per cent. The exact degree of dehydration must be determined by the particular case and the character of the meat. Meat from which bones have been removed will conduct itself differently from meat in which the bones remain, and a thin piece will require a different degree of dehydration than a thick piece. If the fresh meat is cut in slices of more than 5cm. thick, then removal of 15% of water will suffice under some conditions, and the quality of the meat would be poorer if the drying process were forced further. If the meat is cut for example as the rib portions, there would need to be an 18% water loss, which would be increased several percent if the bones were removed before drying. The meat thus treated is then preferably packed in dry salt and may be forwarded to other places in boxes at any temperature without losing its character. In some cases a very short supplementary treatment adapted to further the coagulation of albumin, such as by heating, treating with creosote vapors and the like, may be resorted to; although the preservation of the meat is not considerably improved thereby.

I am aware that it is old to dry meat under access of air. It is possible to render the meat stable by drying under access of air until the weight remains constant or by withdrawing the water at a higher temperature. However, by treating meat after this fashion the interior is altered in such a way that on being made ready for use by the introduction of water it will not assume anew its original character of fresh meat. This is however of the greatest importance in all cases where it is desired to quickly prepare a meat dish from fresh meat which cannot be obtained at all at the place of consumption or only in too fresh condition. In order to solve the problem in question it is not sufficient to dry meat so as to drive out up to 30% water without previously preparing it for such treatment. For immediately after the drying the raw meat will be dried on the outside, but after some time, some meat juice will trickle out and the meat will become greasy and will rot. By proceeding as described above, that is by spraying salt into and on the meat and thus drying it, the escaping of juice will not take place any more after the drying or the juice which might still come forth will be bound by the salt in such a manner as to prevent the meat from rotting.

I am aware that it is old to impregnate the meat with salt by rubbing or spraying and further to tightly pack the meat thus treated. It is equally old to prepare meat in a like manner for the drying with a view to the production of stable dry meat, in other words for the production of meat meal. In these cases however the salt will always diffuse into the meat, whereby the meat invariably loses its character as fresh meat. In the method according to the present invention however there is no question of pickling or salting the meat as owing to the drying which is started immediately after spraying in the salt, this latter has no opportunity of entering into the meat by way of diffusion. In a like manner the packing of the dry meat in powdered salt, which is preferably resorted to in order to facilitate the forwarding of the meat, does not lead to a pickling or salting, inasmuch as no juice will escape from the dry meat. The packing in salt is merely proposed as the most natural and the cleanest way of packing adapted to prevent the meat from being soiled or injured mechanically.

The dry meat obtained after the manner described is stable and is adapted as well for being consumed in raw as also in boiled condition, it being important in the latter case to allow the meat to be boiled immediately without soaking it in the water. This is especially important in the case of field kitchens, where there is no time left for subjecting the meat to a preliminary treatment by soaking and the like. It is further important that the meat treated according to my invention need not be consumed immediately after killing, as is frequently done in the field to the detriment of the troops, there being no time left for allowing the meat to hang. The novel method heretofore described thus allows to obtain a permanently stable dry meat perfectly adapted for the field. This novel product does not require being subjected to a preparatory treatment before being boiled, as was the case with the dry products hitherto known, and nevertheless possesses all the favorable properties of tender fresh meat.

I claim:—

1. The process of treating meat which consists in spraying salt onto the meat and then drying it in a current of air at a temperature below the temperature of coagulation of albumin until a loss in weight between 15% and 30% has been obtained.

2. The process of treating meat which consists in spraying a mixture of salt and condiments onto the meat and then drying it in a current of air at a temperature below the temperature of coagulation of albumin until a loss in weight between 15% and 30% has been obtained.

3. The process of treating meat which consists in spraying salt onto the meat and then drying it in a current of air at a temperature below the temperature of coagulation of albumin until a loss in weight between 15% and 30% has been obtained, whereupon the meat is packed in dry salt.

4. As a new product, dried meat containing at least 70 per cent and not more than eighty-five per cent of the water present in fresh meat and having its outer fissures and excavations covered with powdered salt, said meat being stable for several months and after boiling presenting the characteristics of fresh meat.

In testimony whereof I affix my signature in presence of two witnesses.

GEORG SCHNABEL.

Witnesses:
OSWALD CHRISTOPH,
ALWIN HAUSCH.